United States Patent

[11] 3,526,240

| [72] | Inventor | August Oroza |
| | | Santa Ana, California |
| [21] | Appl. No. | 652,318 |
| [22] | Filed | July 10, 1967 |
| [45] | Patented | Sept. 1, 1970 |
| [73] | Assignee | Robertshaw Controls Company |
| | | Richmond, Virginia |
| | | a corporation of Delaware |

[54] OXYGEN DILUTER WITH MIXTURE NOZZLE
6 Claims, 3 Drawing Figs.

[52] U.S. Cl. .................................................. 137/81,
137/114, 137/604; 251/304
[51] Int. Cl. .................................................. A62b 9/00
[56] References Cited

UNITED STATES PATENTS
| 2,269,500 | 1/1942 | Wildhack | 137/63(R)X |
| 2,616,442 | 11/1952 | Holmes | 137/63(R)UX |

FOREIGN PATENTS
| 126,236 | 6/1959 | U.S.S.R. | 137/63(R)UX |

Primary Examiner—William F. O'Dea
Assistant Examiner—Richard Gerard
Attorney—Auzvillee Jackson, Jr., Robert L. Marben, Christen, Sabol, and O'Brien, Caldwell ABSTRACT: An oxygen-air diluter for breathing apparatus wherein a demand type regulator delivers a flow of oxygen to an air chamber under the control of a variable nozzle for inducing a primary flow of air therethrough, and a secondary stage nozzle responsive to the velocity of the oxygen flow from the variable nozzle induces a secondary flow of air from the air chamber for delivery to the breathing apparatus.

Patented Sept. 1, 1970
3,526,240
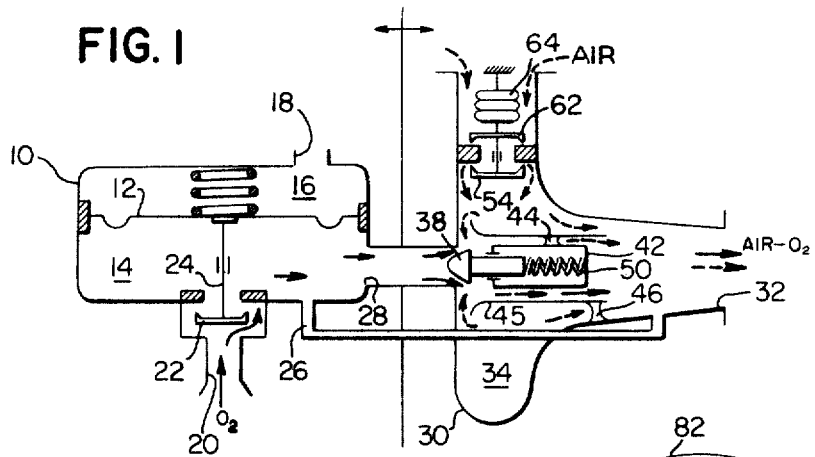
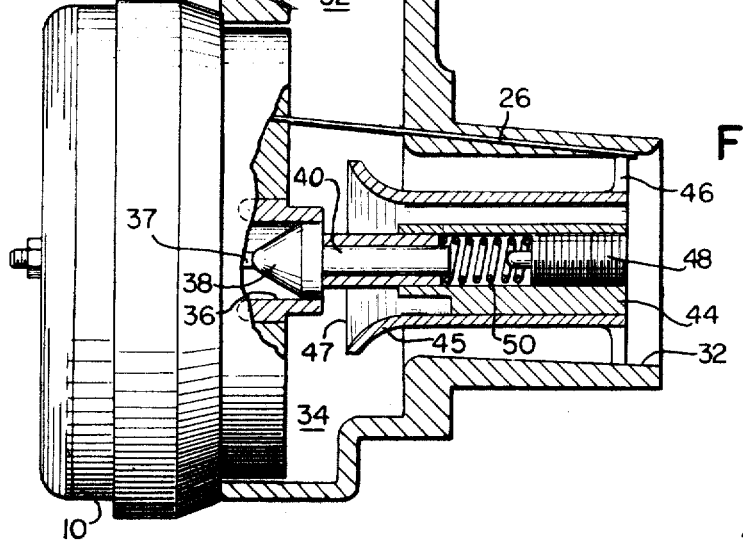
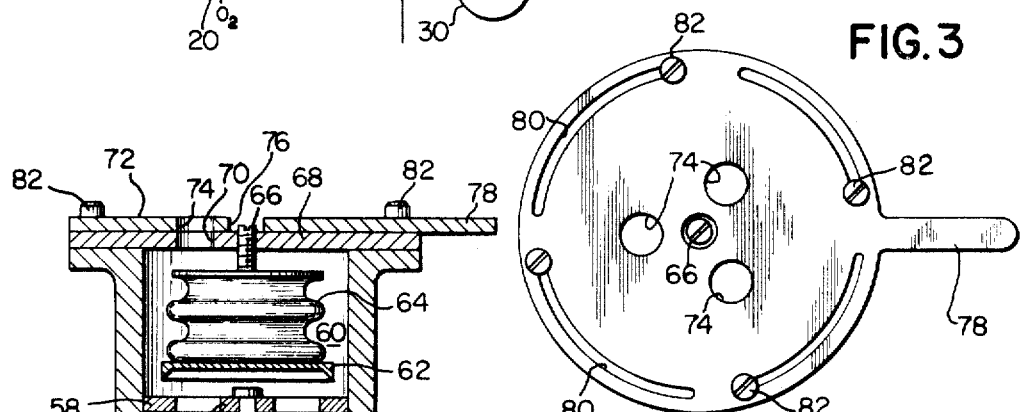
INVENTOR.
AUGUST OROZA
BY
Christen, Sabol, O'Brien & Caldwell
ATTORNEYS 3,526,240

OXYGEN DILUTER WITH MIXTURE NOZZLE

The present invention relates to a breathing apparatus, and more particularly, to an oxygen-air diluter of the type utilized in high altitude and space flights.

Some aircraft oxygen systems presently used in high altitude flying provide 100 percent oxygen from the moment they are put in use; however, from both a physiological viewpoint and an economical viewpoint regarding oxygen consumption during long flights, it is highly desirable to furnish automatically a varying proportion of oxygen as a function of altitude. There are certain conventional systems now in use including panel mounted regulator systems as well as man mounted regulator systems which provide for dilution of oxygen and air in a varying proportion in accordance with atmospheric pressure variations, i.e., from a proportion of 100 percent oxygen and 0 percent air under high altitude flight conditions where 100 percent oxygen is required for breathing purposes to a proportion of 0 percent oxygen to 100 percent air under low altitude flight conditions where only normal air is needed for breathing purposes.

The basic problem of dilution has been approached by injecting air into a mixing chamber and includes a nozzle for the oxygen flow, which nozzle is of the variable type that varies the oxygen flow in response to pressure variation of the oxygen flow from its demand regulator. The variable nozzle provides a jet velocity to induce air into the oxygen stream whereby the amount of air drawn into the system is a function of the variable pressure condition in the mixture chamber. While such a variable nozzle arrangement functions satisfactorily, it is desired to increase the amount of air drawn into the system without affecting the oxygen flow which is determined by the demand regulator.

It is therefore, an object of the present invention to induce a secondary air flow in an oxygen-air diluter system of the air injector type.

Another object of the present invention is to increase the amount of air entrained in an oxygen flow stream without changing the amount of oxygen flow in an oxygen-air diluter system.

The present invention has a further object in that the variable nozzle in an oxygen-air diluter system is provided with a second stage nozzle arrangement.

In accordance with the present invention, a preferred embodiment of an oxygen-air diluter includes a housing having an air inlet, an oxygen inlet, an air chamber communicating with the inlets and an outlet communicating with the chamber, air control means adjacent the air inlet for controlling a flow of air into the chamber, oxygen regulating means adjacent the oxygen inlet for regulating an oxygen flow in response to demand, variable nozzle means automatically controlling the oxygen flow into the chamber in response to pressure variations of the oxygen flow and providing the oxygen flow with a jet velocity for increasing the velocity of primary air from the chamber to the outlet, and secondary nozzle means disposed downstream of the variable nozzle means and upstream of the outlet receiving the oxygen flow and forming a mixture of secondary air and oxygen for delivery to the outlet.

Other objects and advantages of the present invention will become apparent from the following description of a preferred embodiment, taken in connection with the accompanying drawing wherein:

FIG. 1 is a schematic diagram of an oxygen diluter system embodying the present invention;

FIG. 2 is a top view of a part of FIG. 3; and

FIG. 3 is a partial cross section of a breathing apparatus control embodying the system of FIG. 1.

With reference to FIG. 1 of the drawing, a basic oxygen regulator device of the demand type includes a hollow body 10 having a peripherally sealed diaphragm 12 separating the body 10 into two chambers 14 and 16. The chamber 16 is vented at 18 to the atmosphere to define an atmospheric chamber and the chamber 14 has an inlet port 20 which is connected to a suitable oxygen supply.

Adjacent the inlet port 20, a valve member 22 controls the flow of oxygen into the chamber 14; a valve stem 24 has one end connected to the valve element 22 and an opposite end connected to one side of the diaphragm 12, which may be inherently spring biased or which may be provided with a biasing spring in the chamber 16 acting on the other side of the diaphragm. Movement of valve element 22 is effected by a pressure differential between oxygen chamber 14 and atmospheric chamber 16; such differential varies in accordance with atmospheric pressure in chamber 16 and in accordance with oxygen pressure variations established by demand of the user. Chamber 14 is thus designated as a demand chamber and has a demand sensing port 26 and an outlet port 28.

The diluter part of the breathing apparatus control includes a hollow casing 30 having an outlet 32 adapted to be connected to the breathing device such as a helmet or face mask (not shown). The outlet 32 extends from an air chamber 34 which communicates with the demand chamber outlet port 28 by means of an opening or orifice 36. An internal wall in the demand chamber 14 of the oxygen regulator 10 includes a stop element 37 which defines one limit of movement of a nozzle valve 38 that is slidably disposed in the orifice 36 with a slight clearance therebetween for a minimum oxygen flow condition. Oxygen flow through the orifice 36 is varied by the properly contoured poppet 38 formed on one end of a stem 40 having a bearing fixed thereto in the form of a sleeve made of nylon or the like. The other end of stem 40 and its sleeve slidably extend into the open end of an axially aligned cylinder 42 which is supported by a plurality of spider arms 44 spaced about the outer wall of cylinder 42 and attached to the inner wall of a nozzle tube 45. The nozzle tube 45 is supported by a plurality of spider arms 46 spaced about its outer wall and attached to the adjacent internal wall portions of casing 30. The spider arms 44 and 46 are properly contoured to provide streamline flows therearound. Opposite its mounted end, the nozzle tube 45 is provided with an outwardly flared inlet throat 47 disposed in the chamber 34 and surrounding the area in which the nozzle poppet 38 reciprocates. Opposite its opened end, the cylinder 42 is closed by an adjustable screw 48; a coil spring 50 in the cylinder 42 is mounted in compression between the screw 48 and the inner end of the sleeve fixed to the poppet stem 40. With such an arrangement the biasing force of the coil spring 50 may be adjusted by rotation of the adjusting rod 48 which is located on a longitudinal axis defined by the centrally aligned axis of the outlet 32, the chamber 34 and the orifice 36.

As is illustrated in FIG. 3, the air chamber 34 communicates with an air flow passage 52 which is controlled by a one-way check valve 54 being made of suitable flexible material so as to be pressure responsive. The valve 54 is centrally attached to a ported valve plate 56 that is securely fastened to a shoulder 58 formed in an internal wall portion of casing 30. The ported valve plate 56 separates the air flow passage 52 from an air intake conduit 60 and air flow therethrough is controlled by the valve 54 in accordance with a differential pressure between passage 52 and conduit 60. In addition to the one-way check valve 54, the ported valve plate 56 is separately controlled by a valve disc 62 secured to the bottom wall of an aneroid bellows 64. The top wall of bellows 64 carries an adjusting screw 66 which is threaded through a suitably threaded opening centrally disposed on a fixed cover plate 68. The bellows 64 thus has one end adjustably fixed in the conduit 60 and an opposite end with valve 62 thereon being movable relative to the valve plate 56 in response to atmospheric pressure variations in the conduit 60.

The cover plate 68 is provided with three equally circumferentially spaced air inlet openings 70 (only one being shown in FIG. 3) which are controlled by a manually movable closure plate 72. As is shown in FIG. 2, the closure plate 72 is provided with three equally circumferentially spaced air ports 74 which are aligned with the inlet openings 70 in the fixed cover plate 68. A central opening 76 in the closure plate 72 permits access to the adjusting screw 66 and defines an axis of rotation for the closure plate 72 which is rotated by a lever arm 78 projecting radially outwardly from the circumference thereof. Adjacent its periphery, the closure plate 72 is provided with a plurality (four) of arcuate slots 80 and a similar plurality (four) of headed fasteners 82 which have threaded shanks (not shown) extending freely through their respective slots 80. The heads of the threaded fasteners 82 are larger than the width of the slots 80 and the threaded shanks extend through aligned openings in the fixed cover plate 68 and terminate in threaded bores (not shown) in a flange portion of the casing 30. The threaded fasteners frictionally clamp the closure plate 72 to the fixed cover plate 68 to prevent accidental movement thereof; however, the closure plate 72 may be moved by the manual lever 78 whereby the closure plate 72 slides on the fixed cover plate 68 for selectively positioning the air ports 74 in and out of registery with the inlet openings 70.

In the following description of a sequence of operation of the present invention, it is to be noted that any suitable type of a basic oxygen regulator control may be utilized and the schematic arrangement of such control has been oversimplified in FIG. 1 for the sake of brevity. Accordingly, it is assumed that an oxygen regulator of the demand type is being used; i.e., the oxygen valve 22 is opened and closed in accordance with the demand sensed at the regulator's demand chamber 14 whereby the control position of the oxygen valve 22 is accordingly varied with inhalation and exhalation at the face mask. Thus, the flow of oxygen is zero at the start of inhalation, rises to a maximum during inhalation, then decreases to zero and remains zero during exhalation.

Assuming now that there is no demand for oxygen, the oxygen valve 22 is closed and the atmospheric pressure in aneroid conduit 60 causes contraction of the bellows 64 whereby the valve disc 62 is displaced from the ported valve plate 56. Under such conditions, the controlling components are positioned as shown in FIG. 3, i.e., since there is no oxygen flow, the poppet 38 is biased against the stop 37 to its extreme position of substantially closing the orifice 36. During inhalation at the face mask, the pressure in passage 52 is decreased and the differential pressure between conduit 60 and passage 52 causes the oneway valve 54 to open and air is drawn through the aligned openings 74 and 70, conduit 60, ported valve plate 56 and passage 52 to the air chamber 34; thus, 0 percent oxygen and 100 percent air is delivered to the outlet 32. As is well known in the art, the face mask includes some form of exhalation valve to expel exhaled air to the atmosphere rather than back through the outlet 32. Such exhalation increases the pressure in passage 52 so that the valve 54 closes the ported valve plate 56.

Under conditions of high altitude where 100 percent oxygen is needed, the atmospheric pressure in conduit 60 causes expansion of bellows 64 whereby the valve disc 62 closes the ported valve plate 56 so there is no air flow. At the same time the oxygen valve 22 is positioned in response to inhalation and exhalation at the face mask. During such conditions, 0 percent air and 100 percent oxygen is delivered from the chamber 14 and through the orifice 36 and the pressure of such flow displaces the poppet 38 against the bias of the coil spring 50 so that there is substantially no restriction downstream of the demand chamber 14.

Turning now to conditions of an intermediate altitude or conditions of a varying altitude, the oxygen regulator device 10 supplies a flow of oxygen to outlet port 28 as a function of the face mask demand and the air inlet control valve 62 is opened by the contraction of bellows 64 in response to atmospheric pressure. The pressure of the oxygen flow acting on the contoured poppet head 38 moves the piston stem 40 inwardly in the cylinder 42 which guides such stem movement; should there be any abrupt changes or line pressure variations, the coil spring 50 acts as a damper to prevent oscillation or hunting of the head 38 in the orifice 36 and to assure a smooth stable movement of the head 38 in automatically responding to the oxygen flow. Movement of the hemi-spherically contoured head 38 varies the cross-sectional flow area of the orifice 36 and the head 38 is contoured in such a manner that under the influence of the forces acting on it by the pressure differential the hydrodynamic forces and the spring force, the piston 38—40 seeks a balanced position. In such balanced position, the hemi-spherical contour on the head 38 results in a high velocity jet of oxygen flow into the chamber 34. The high velocity jet causes a reduced pressure in the passage 52 whereby the one-way valve 54 is flexed to an open position and air is induced to flow through the ported valve plate 56 and into the chamber 34 where it is entrained with the oxygen flow; the mixture then flows through the nozzle tube 45 to the outlet 32 for supplying the breathing apparatus.

As the oxygen flow increases and the pressure downstream of the regulator valve correspondingly increases, the piston 38—40 attains a new equilibrium position which by the hemispherical profile of head 38 increases the flow area of the orifice 36 whereby the velocity of the jet is maintained without appreciable change in back pressure. When the demand of oxygen in the regulator sensing conduit 26 determines that the regulator 10 must deliver a large quantity of oxygen, such as when there is no air flow through the ported valve plate 56, the poppet head 38 senses the large increase in force due to nozzle back pressure and responds by increasing the flow area of orifice 36; thus the pressure downstream of the regulator's demand valve is relieved and the regulator attains full flow capacity free of oscillation.

The primary flow of air from the chamber 34 is entrained in the flow emerging from the nozzle tube 45 slightly upstream of the outlet 32. The secondary flow of air from the chamber 34 is entrained in the oxygen flow emerging from the variable nozzle 36—38 whereby a mixture of secondary air and oxygen is delivered into the nozzle tube 45. With such an arrangement, the mixture of oxygen and air entering the throat 47, having been induced by the primary nozzle 36—38, serves as a source of new inducing energy for additional dilution; this is due to the mixture entering the throat 47 with considerable velocity and some further velocity being induced by the flared shape of the throat 47. This throat flow is discharged into a volume at the outlet 32 which is just ahead of the entrance to the inhalation valve (not shown) whereby there is an exchange of momentum between the mixture discharged by the nozzle tube 45 and the primary flow of air along the external surface of tube 45. The effect of this secondary or second stage nozzle feature is a net gain in the total air induced in the system for any particular setting of the primary nozzle as compared to a similar system with only a primary nozzle.

In the above arrangement, the orifice 36 and the biased piston 38—40 with its slide guide constitutes a variable area nozzle assembly which responds automatically to oxygen flow from the demand regulator 10 for establishing a high velocity jet flow that produces the air injection effect necessary to provide dilution over the entire range of dilution proportions. By establishing a high jet velocity, the variable area nozzle obtains large air drawing power at increasing rates of flow within the range desired for dilution levels at a relatively high injector efficiency because the unfavorable conditions of high nozzle back pressure is minimized. The above arrangement presents the additional advantage in that when high flows of oxygen are required and the dilution system is no longer required (as at high altitudes), the nozzle is practically removed from the system due to the increased flow area at the orifice and the practically unrestricted flow of 100 percent oxygen to the outlet 32.

In accordance with the present invention, the oxygen diluter system may be manually controlled to provide 100 percent oxygen regardless of altitude or atmospheric pressure. In such an instance, the manually operated lever 78 is rotated clockwise as viewed in FIG. 2 to a position where the fasteners 82 engage the opposite edges of the corresponding slots 80; thus, the ports 74 are moved out of registry with the openings 70 and the flow of air to the aneroid conduit 60 is cut-off. The system then operates as described above when valve 62 cuts off the intake air flow and 100 percent oxygen is delivered to the outlet 32.

Inasmuch as the preferred embodiment of the present invention is subject to many variations, modifications and changes in detail, it is intended that all matter contained in the foregoing description or shown on the accompanying drawing shall be interpreted as illustrative and not in a limiting sense.

I claim:

1. An oxygen-air diluter for breathing apparatus comprising:
   a housing having an air inlet, an oxygen inlet, an air chamber communicating with said inlets, and an outlet communicating with said chamber to receive a primary flow of air therefrom;
   air control means adjacent said air inlet for controlling a flow of air from said air inlet into said chamber;
   oxygen regulating means adjacent said oxygen inlet for regulating an oxygen flow in response to demand; variable nozzle means in said chamber automatically controlling the oxygen flow into said chamber in response to pressure variations of the oxygen flow from said oxygen regulating means;
   said variable nozzle means providing the oxygen flow with a jet velocity for increasing the velocity of the primary flow of air at said outlet; and
   secondary nozzle means disposed downstream of said variable nozzle means and upstream of said outlet receiving the oxygen flow and forming a mixture of a secondary flow of air with the oxygen flow for delivery to said outlet.

2. The invention as recited in claim 1 wherein said secondary nozzle means comprises a nozzle tube having a flared throat to increase the velocity of the mixture flowing therethrough.

3. The invention as recited in claim 1 wherein said secondary nozzle means comprises a nozzle tube having an opening disposed adjacent said outlet whereby the mixture flow out of said opening induces the flow of primary air from said chamber.

4. The invention as recited in claim 3 wherein said nozzle tube has a flared throat adjacent said variable nozzle means whereby the velocity of the oxygen flow therefrom induces a secondary flow of air from said chamber into said nozzle tube.

UNITED STATES PATENT OFFICE
CERTIFICATE OF CORRECTION

Patent No. 3,526,240    Dated September 1, 1970

Inventor(s) August Oroza

It is certified that error appears in the above-identified patent and that said Letters Patent are hereby corrected as shown below:

In column 6 after the last line, insert the following claims 5 and 6:

5. The invention as recited in claim 1 wherein said air control means includes valve means operative in response to pressure conditions in said chamber, and wherein said secondary nozzle means comprises a nozzle tube having a flared throat increasing the velocity of the flow therethrough whereby the pressure in said chamber is reduced and the air control valve means increases the air flow into said chamber.

6. The invention as recited in claim 5 wherein said variable nozzle means includes an orifice defining a flow area and nozzle head means automatically positioned relative to the orifice in response to the oxygen flow through said flow area whereby the velocity of the oxygen flow to said flared throat is increased.

SIGNED AND
SEALED
NOV 10 1970

(SEAL)
Attest:

Edward M. Fletcher, Jr.
Attesting Officer

WILLIAM E. SCHUYLER, JR.
Commissioner of Patents